Nov. 27, 1934.    A. HORMEL ET AL    1,981,915
MANUFACTURE OF METAL WARE
Filed July 1, 1932
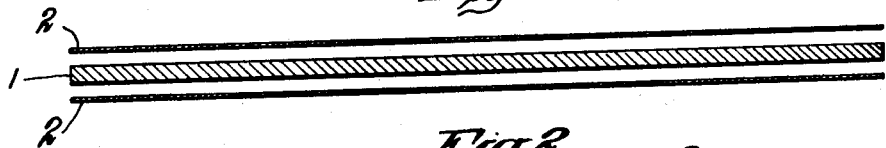
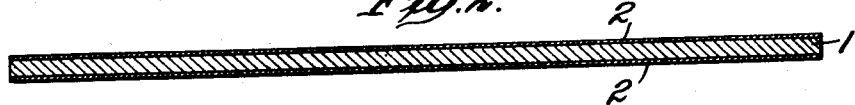
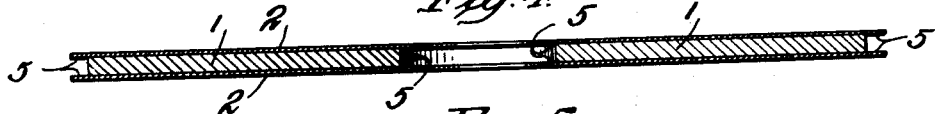
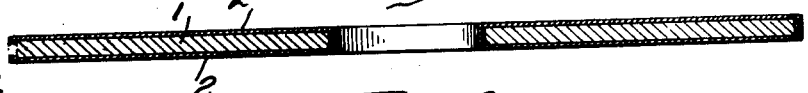
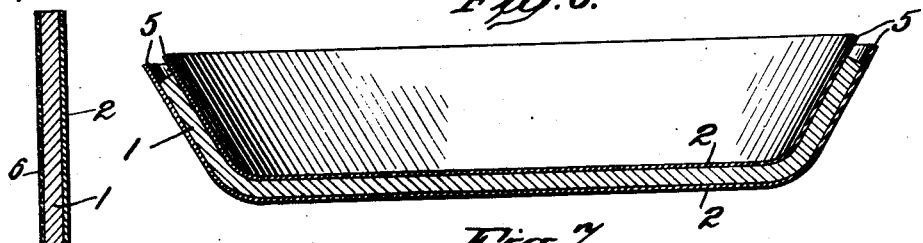
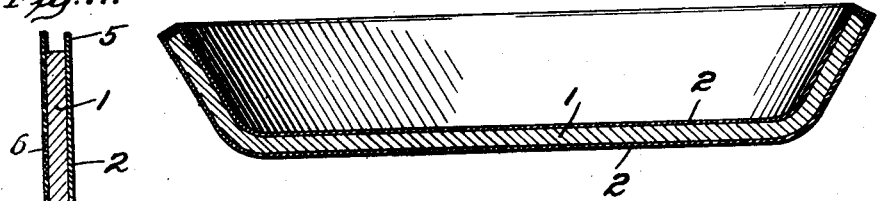
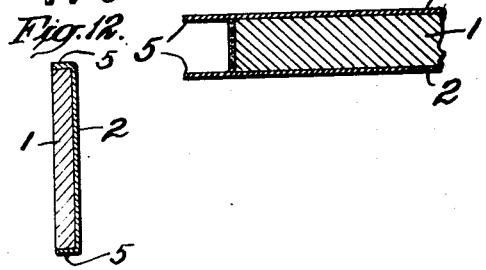
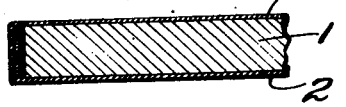
INVENTORS
AUGUST HORMEL
BY WALTER RUSSELL
ATTORNEY Patented Nov. 27, 1934

1,981,915

UNITED STATES PATENT OFFICE 1,981,915

MANUFACTURE OF METAL WARE

August Hormel, Hoboken, and Walter Russell, Ridgewood, N. J.; said Russell assignor to said Hormel Application July 1, 1932, Serial No. 620,440

2 Claims. (Cl. 29—148.2)

The present invention relates to improvements in the manufacture of metal ware of acid or corrosion resisting properties and has for its object to produce metal articles which are highly resistant to and fully protected against corrosion in a manner offering important economies in commercial production not heretofore obtained.

In the manufacture of metal articles in accordance with the preferred embodiment of our invention, the articles produced are made from an improved sheet metal having a core or central layer of inexpensive soft iron or carbon steel to which are welded or fused upper and lower surface layers of relatively thin sheets or plates of acid resisting alloy. These surface or protective layers are desirably of chromium alloy steel thereby offering high corrosion resistance with a materially reduced weight of the more expensive alloy employed. In the forming of the articles by stamping or cutting and forming, the edges of the metal are normally unprotected by the corrosion resisting alloy with a surface exposure of the central body or core material of corrosive iron or carbon steel and is thus objectionable where fu . protection is desirable. This objection we have overcome in an inexpensive and successful manner by a removal of a portion of the corrosive core material at the severed edges of the blank or article so as to leave projecting marginal extensions of the chromium alloy which are then turned inwardly over the core material to cover the edge portions thereof and thereby offer full protection to the finished article. The removal of the marginal core material is inexpensively accomplished by immersion of the blank or formed article within a nitric or other suitable acid bath for a time sufficient to remove the required amount of the core material to allow of the protective layers being turned inwardly thereover. The protective layers of the corrosion resisting alloy may desirably be overlapped in tight sealing engagement and in accordance with a further feature of our invention a special sealing or protective substance may be applied to the exposed edge surface of the core material prior to the turning over of the outer layers to be enclosed thereby, such as an acid resisting lacquer, rubber cement, or other suitable protective material.

The aforesaid and other valuable features and advantages of our present improvements will be more fully understood by reference to the accompanying drawing and detailed description thereof and wherein like reference characters are applied to the corresponding parts in the several views.

In the drawing:

Fig. 1 is a diagrammatic, sectional view of the separated rolled metal sheets of which the laminated or compound sheet metal is made.

Fig. 2 is a similar view of the finished sheet.

Fig. 3 is a sectional view of a stamped out blank for the making of an article in the form of a centrally perforated disc.

Fig. 4 is a view thereof after processed to remove the marginal edge portions of the core metal.

Fig. 5 is a similar view of the completed article having the non-corrosive metal turned over in protecting position.

Figs. 6 and 7 illustrate the present invention as related to the manufacture of an article of dished or pan form, the former showing the sheet metal shaped to form with the marginal core material removed and the latter the article completed by bending over of the protective surface metal to seal the marginal edge portion.

Figs. 8 and 9 show in partial section a modified form having incorporated additional protective material, showing the same before and after turning over of the protective alloy metal.

Figs. 10, 11 and 12 are sectional views showing a further modification wherein a protective lacquer is employed to protect one surface and the edge protected by turning over of an opposite surface layer of chromium alloy.

Fig. 10 shows the metal sheet having one surface layer of chromium alloy, and the opposite face covered with a lacquer.

Fig. 11 shows the same after immersion in acid and Fig. 12 shows the finished article with the chromium alloy turned over the edge and the lacquer removed.

The metal sheets employed for the manufacture of articles in accordance with our invention are, as shown in Figs. 1 and 2, formed of a central core sheet 1 of ferrous material which is a rolled sheet of soft iron or ordinary carbon steel to the opposite surfaces or faces of which are applied relatively thin sheets of rolled chromium steel 2—2 which are united to the core sheet by fusion welding therewith thereby to produce an integral sheet metal of compound type having upper and lower surface layers of corrosion or acid resisting material with a supporting central core of relatively inexpensive iron or steel of a character to suit its intended purpose.

In the approved manner of making an article from such sheets in accordance with our improvements, a suitable blank is cut therefrom as for instance by stamping out of a circular disc as shown in Fig. 4 having a central aperture 4 and adapted to form a bobbin support, washer or like article. The blanked article, thus formed, is then immersed in a bath of nitric or other acid for a suitable length of time to effect the eating away of the edgewise exposed non-acid resisting core material to the degree sufficient to produce marginal edge projection 5 of the outer layers of chromium steel to an extent or of sufficient depth to cover the exposed edge of the core when turned inwardly thereover, as shown in Fig. 5. The extended chromium steel projections 5 are then turned inwardly by spinning, rolling or pressing into tight overlapping relation, as shown in Fig. 5 to complete an article having full surface protection of the chromium or acid resisting metal as a result of the full enclosure of the core metal.

In Figs. 6 and 7, the article produced is shown as of dish or pan form which may be produced by initially stamping out and forming of the sheet material, after which the formed article is subjected to the action of an acid bath to remove sufficient of the marginal edge core metal to produce the extensions or flanges 5 of chromium alloy metal and the article completed as aforesaid by turning over of the protective marginal extensions of the surface layers.

While for general uses it suffices to protect the edge portions by merely rolling over the outer edge surface metal into close sealing contact, the corrosion resistance may be further increased, as shown in Figs. 8 and 9 by applying to the edge of the core metal a protective material such as an acid resisting lacquer or rubber cement, prior to the turning in of the protective metal and to be enclosed thereby.

Metal ware, in accordance with our invention, is produced by an improved and relatively inexpensive process with a material economy of the higher priced surface or chromium alloy and producing an improved product having full surface protection of the special corrosion resisting alloy.

In Figs. 10 to 12, there is shown a further modification adapted for forming edge protected articles from compound sheet metal of the character described having a layer of the chromium alloy on one surface only. Therein, 1 indicates the core of corrosive metal having a single surface layer, 2 of chromium alloy. As shown in Fig. 10 upon the opposite face, there is applied a covering of acid resisting lacquer 6. The blank or article is then immersed in acid to eat away a portion of the edge exposed core metal as shown in Fig. 11. The lacquer is then removed and the resulting extension 5 of chromium alloy turned over into protecting position as shown in Fig. 12. There is thus economically produced an article having one face and edge protection of the non-corrosive alloy.

While there are shown and described the preferred embodiments of the features of our invention, it will be understood that various modifications thereof may be made without departing from the scope of the invention as defined in the appended claims. It is accordingly intended that all matter herein shall be interpreted as illustrative and not in a limiting sense.

Having described our invention, we claim:

1. The herein described process of making corrosion resisting sheet metal ware which consists in uniting with a core sheet of ferrous metal of corrosive characteristics, surface layers of acid resisting ferro-chromium alloy, cutting out blanks of said compound metal, subjecting said blanks to the action of an acid to remove a portion of the core metal at the edge portions of the blank thereby to leave marginal extensions of the surface alloy, applying a protective material to the exposed surfaces of the core metal and finally turning over said extension alloy metal to give protection to the edges of the finished ware.

2. The herein described process of making corrosion resisting sheet metal ware which consists in welding with a core sheet of ferrous metal of corrosive characteristics, surface layers of acid resisting ferro-chromium alloy, cutting out blanks of said compound metal, subjecting said blanks to the action of an acid to remove a portion of the core metal at the edge portions of the blank thereby to leave marginal extensions of the surface alloy and finally turning over said extension alloy metal in overlapping relation to give protection to the edges of the finished ware.

AUGUST HORMEL.
WALTER RUSSELL.